United States Patent [19]
Fullerton et al.

[11] 3,799,115
[45] Mar. 26, 1974

[54] ANIMAL CROWDING GATE

[76] Inventors: Marvin R. Fullerton, Box 4, Diamond, Md. 64840; Jess S. Hoover, Rt. 3; Homer Baugh, Limestone St., both of Carthage, Mo. 64836

[22] Filed: Jan. 8, 1973

[21] Appl. No.: 321,653

[52] U.S. Cl............................ 119/20, 119/22, 119/82
[51] Int. Cl................................................. A01k 29/00
[58] Field of Search........................... 119/20, 22, 82

[56] References Cited
UNITED STATES PATENTS

| | | | |
|---|---|---|---|
| 2,691,359 | 10/1954 | Anstiss et al. | 119/20 |
| 3,343,521 | 9/1967 | Moores | 119/20 |
| 3,458,029 | 7/1969 | Allen et al. | 119/22 X |
| 286,575 | 10/1883 | Barnes | 119/82 |
| 409,222 | 8/1889 | McIver et al. | 119/82 |

*Primary Examiner*—Hugh R. Chamblee
*Attorney, Agent, or Firm*—Alfred R. Fuchs

[57] ABSTRACT

A gate for crowding animals toward the exit of a runway that has parallel side walls and a floor. The gate extends downwardly from a frame extending across the runway. A motor on the frame drives flanged wheels engaging rails mounted on the side walls. Counterweights are on the frame near the wheels for increasing the frictional grip of the wheels on the rails. The gate has a floor scraper that is mounted so as to be movable up and down and swing about a horizontal axis relative to the gate, and a curved plate mounted to move with the scraper to swing the scraper away from the floor when it encounters debris on the floor during movement toward the exit. Limit switches are provided to halt the motor when the gate reaches the end of its desired travel in either direction.

19 Claims, 8 Drawing Figures

ANIMAL CROWDING GATE

It is a purpose of our invention to provide a barrier or gate that is movable along a runway that leads to a cow milking station at a dairy. The runway has an entrance for the cows adjacent one end and is provided with doors that are movable into and out of position to close or open exit openings that lead to the milking area. Our invention provides a gate or barrier that is mounted so as to extend across the runway and is provided with means for moving it to push gently against the cows nearest the entrance to the runway to urge or crowd them toward the exit openings, the movement of the cows nearest the gate toward the cows in the front of them causing all the cows to move toward the exit end of the runway.

While means have been provided, previous to our invention, that move cows through a receiving area toward a milking area by means of a movable barrier, such means for crowding the animals toward an exit of the receiving area, were not so constructed as to gently push against the animals, where power means were provided for this purpose. There have been movable gates or barriers that were manually operated as, for example, by means of a crank winding up a cable on a drum to pull a movable fence section from one end to the other end of a corral. In none of the devices that were provided for moving a barrier or gate from one end or side to the other end or side of a corral or other confining area for animals has there been means provided whereby the force that is exerted on the gate can be controlled so that the amount of force exerted on the cows by the gate will be sufficient to cause the cows to move forwardly and will prevent any cow from moving the gate backwardly, but will not roughly push on the cows.

The runway we provide has upstanding side walls, an end wall at one end of said side walls and door controlled exit openings at the other end of said side walls. Motor driven wheels are provided on a frame from which the crowd gate extends downwardly, which wheels operate on rails that are provided on the tops of the side walls, the frictional grip of the wheels on the rails being controlled by providing counterweights on the frame of proper weight to provide the desired frictional grip of the wheels on the rails for obtaining the desired gentle pushing action of the cows, and to prevent movement backwards toward the entrance end of the runway of the gate by the cows.

The motor for driving the wheels is controlled by a manually operated reversing switch so that the motor will rotate the wheels in a direction to move the gate toward the exit end of the runway, or from the exit end toward the entrance end, as desired. Limit switches are provided for halting the motor when the gate reaches the end of its desired amount of travel in both the direction toward the exit end and toward the entrance end of the runway.

While various scrapers have been provided for cleaning manure and other debris from a floor of a building or other area in which cows and other animals may be confined, no such floor cleaning apparatus has been previously provided, as far as we are aware, with a gate that is provided with a floor scraper that is so mounted that is is capable of both up and down movement and swinging movement about a transverse axis relative to the gate, and which will operate to have scraping engagement with the floor, when the gate is moved from the exit end toward the entrance end of the runway, and will raise the scraper off the floor while manure or other debris is being encountered while the gate is being moved toward the exit end of the runway.

We provide such a floor scraper in connection with our gate. The means for raising the scraper off the floor while such debris is encountered, comprises a curved spring plate that is mounted to move with the scraper, which plate is adjacent the floor and will be swung in an upward direction relative to the floor while debris is encountered, thus keeping the scraper up off the floor along with said plate as long as the curved plate is encountering such debris. Thus, any accumulation of any debris on the floor will be passed over as the gate moves toward the exit openings at one end of the runway and will scrape the manure or other debris toward the entrance end of the runway while the gate is moving toward the entrance end of the runway.

Other objects and advantages of our invention will appear as the description of the drawings proceeds. We desire to have it understood, however, that we do not intend to limit ourselves to the particular details shown or described except as defined in the claims.

Referring in detail to the drawings, in FIGS. 1 to 4 inclusive a runway for animals, such as cows, is shown which has a pair of longitudinal side walls 10, end wall 11 and a bottom wall 12 providing a floor 13. The wall 11 is adjacent the entrance end of the runway. End wall portions 14 are provided at the exit end of the runway leaving door openings 15, that lead to a milking area and are adapted to be closed by means of doors 16, which operate on tracks 17. A partition having obliquely extending wall portions 18 and a short transverse wall portion 19 divides the runway into two portions to direct the animals toward the door openings 15. An entrance opening 20 in one of the side walls adjacent the end wall 11 is provided which is closed by means of a door 21 operating on a track 22.

Mounted on top of each of the side walls 10 is a rail 23 which is held in fixed position thereon in any suitable manner. A stop member 24 is provided on each rail at one end thereof and a stop member 25 is provided on each rail on the other end thereof. Extending crosswise of the runway is a frame having longitudinal members 26 and cross members 27. Mounted on the end cross members 27 are bearings 28 for shafts 29 and 30. Bearing members 28' are also provided on one of the cross members 27 substantially midway of the frame for said shafts 29 and 30. Flanged wheels 31 are provided on the ends of each of the shafts 29 and 30, being fixed thereto so as to rotate with said shafts and engage with the rails 23.

A motor 32 is mounted on a pair of transverse frame members 27' and its output shaft is provided with a sprocket 33 over which a chain 34 operates, the chain operating over a sprocket 35 mounted to rotate with the stub shaft 36 which is mounted in bearings 37 on one of the frame members 27' and one of the frame members 27. A sprocket 38 is also mounted on the shaft 36 to rotate therewith, a sprocket chain 39 engaging with the sprocket 38 and extending over the sprockets 40 and 41 mounted on the shafts 29 and 30 to rotate therewith, the motor thus driving the shafts 29 and 30 in the same direction and at a reduced speed with respect to the output shaft of the motor 32.

Figure 4:
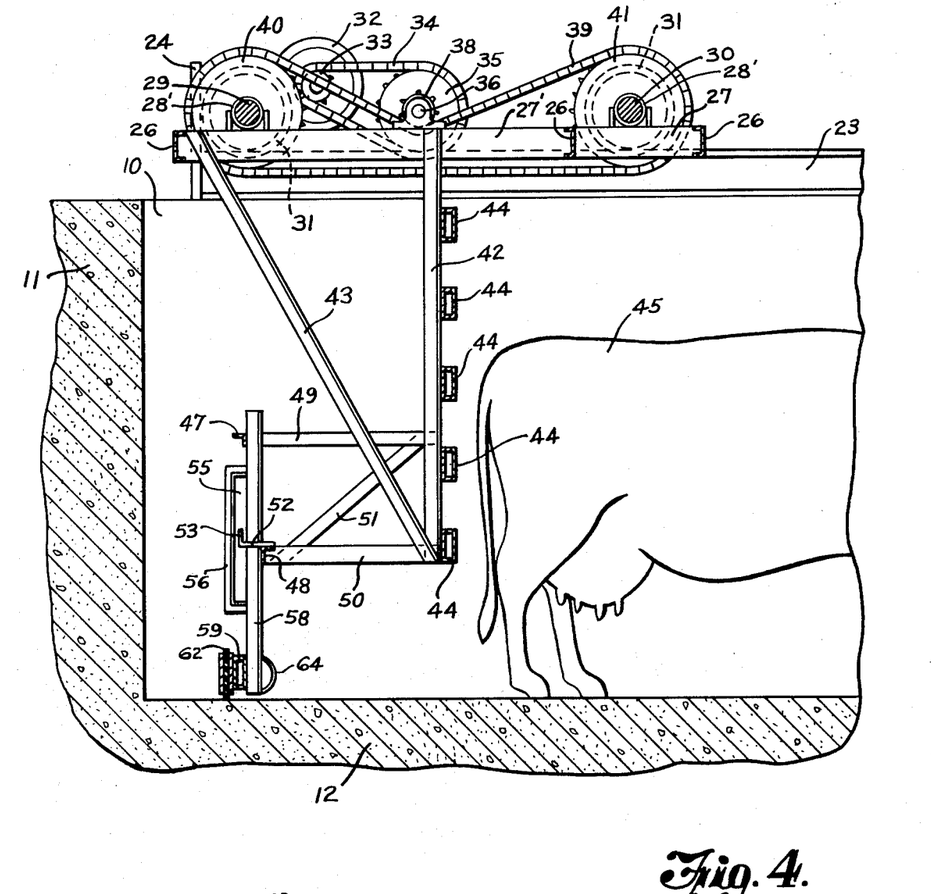
FIG. 4 is a view partly in elevation and partly in longitudinal section through a fragmentary portion of the runway showing our gate in position therein.

Extending downwardly from the frame comprising the members 26 and 27 are angle members 42. Obliquely extending bracing members 43 are also provided, extending from the lower ends of the angle members 42 to the transverse frame members 27. A plurality of horizontally extending hollow bars 44 are mounted in uniformly spaced relation on the angle members 42, being preferably rectangular in cross section, as shown in FIG. 4. The members 42, 43 and 44 thus form a gate that extends downwardly from the frame comprising the members 26 and 27.

The gate, by crowding into the cows, such as the cow 45 shown in FIG. 4, causes the cows to move toward the exit openings 15 and pass through the same, if the doors 16 are in open position. Cows are directed into the runway through the doorway 20 until the number of cows desired has entered the runway, whereupon the door 21 is closed. The cows will be located in the runway as diagrammatically illustrated in FIG. 1, and if the rearmost cow or cows are urged toward the exit end of the runway by engagement of the bars 44 of the gate with the rearmost cow or cows, the movement of the rearmost cows toward the cows in front of the same will cause the eventual movement of all of the cows toward the exit end of the runway. It is desired to exert only enough force on the rearmost cows to cause them to move forwardly and yet to provide sufficient force, provided by means of the motor 32, to prevent any cow from moving the gate in a direction away from the exit end of the runway. The force exerted by the motor 32 in moving the gate toward the exit end of the runway is dependent upon the frictional grip of the wheels 31 on the rails 23 and the frictional grip of the wheels 31 on the rails 23 will be dependent upon the amount of weight that the frame, gate and driving means apply to the shafts 29 and 30, and in turn to the wheels 31. In order to provide exactly the desired amount of gripping action on the rails 23 by the wheels 31, counterweights 46 and 46' are mounted on the frame that carries the gate. Preferably the counterweights 46 are detachably mounted on one of the longitudinal frame members 26, as shown in FIG. 2, and the counterweights 46' on the diagonal bracing members 67 in any suitable manner so that the total weight of each thereof may be varied as may be found desirable to get the desired effect. The counterweights 46 are preferably located adjacent the flanged wheels 31 that are forwardmost and the counterweights 46' adjacent the flanged wheels 31 that are rearmost, when the gate is being moved toward the exit end of the runway.

A scraper frame is mounted on the lower end portions of the vertical angle members 42, said scraper frame comprising a pair of longitudinally extending angle members 47 and 48 constituting upper and lower frame members, respectively, extending substantially from adjacent one of the side walls 10 to adjacent the other side wall 10 of the runway, horizontally extending transverse frame members 49 and 50 secured to the angle members 42 and 47 and 48 and diagonally extending bracing members 51. Said frame members 48 are provided with guide brackets 52 which have upwardly extending portions 53 and transversely extending portions 54 which extend through slots 55 provided between brackets interengaging therewith having vertically extending portions 56 and horizontal end portions 57 secured in fixed position on the upstanding angle bars 58 provided on the scraper structure. Said upstanding bars 58 are secured at the lower ends thereof to a horizontally extending hollow box-like member 59 in fixed position. The scraper body member 59 extends substantially from one side wall 10 to the other side wall 10.

Mounted on the horizontally extending body portion 59 of the scraper are steel plates 60 and 61 between which is mounted a scraper member 62 which has an end portion 63 extending beyond the bottom edges of the plates 61 and 62. The scraper member 62 is preferably made of belting or similar stiff flexible material. Also mounted on the vertically extending members 58 at their lower ends is a curved plate 64 of spring metal which is secured in position with one edge 65 thereof bearing against and secured in fixed position, as by welding, to the vertically extending members 58 of the scraper in spaced relation from the bottom ends of the members 58 and having the other edge portion thereof 66 extending under the bottom ends of the vertically extending members 58, and also secured thereto by welding. Said curved spring metal plate extends across the runway from adjacent one side wall 10 to adjacent the other side wall 10 thereof.

Figure 5:
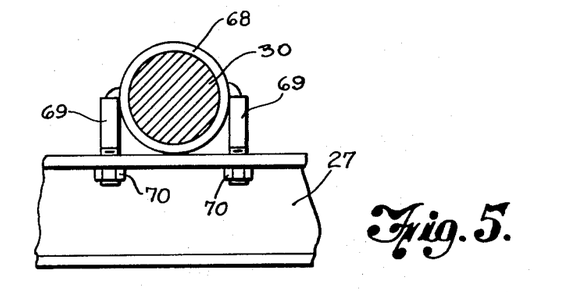
FIG. 5 is a fragmentary detail view showing a bearing member for one of the shafts.

The bearing members 28 are shown more in detail in FIG. 5 and comprise a bronze bearing sleeve 68, in which the shafts 29 and 30 rotate, to which bolts 69 are welded, securing the bearing member in position on the frame, such as on the frame member 27 shown in FIG. 5, the nuts 70 being provided for clamping the bearing members to the frame. The bearing members 28' are similarly constructed.

Figure 1:
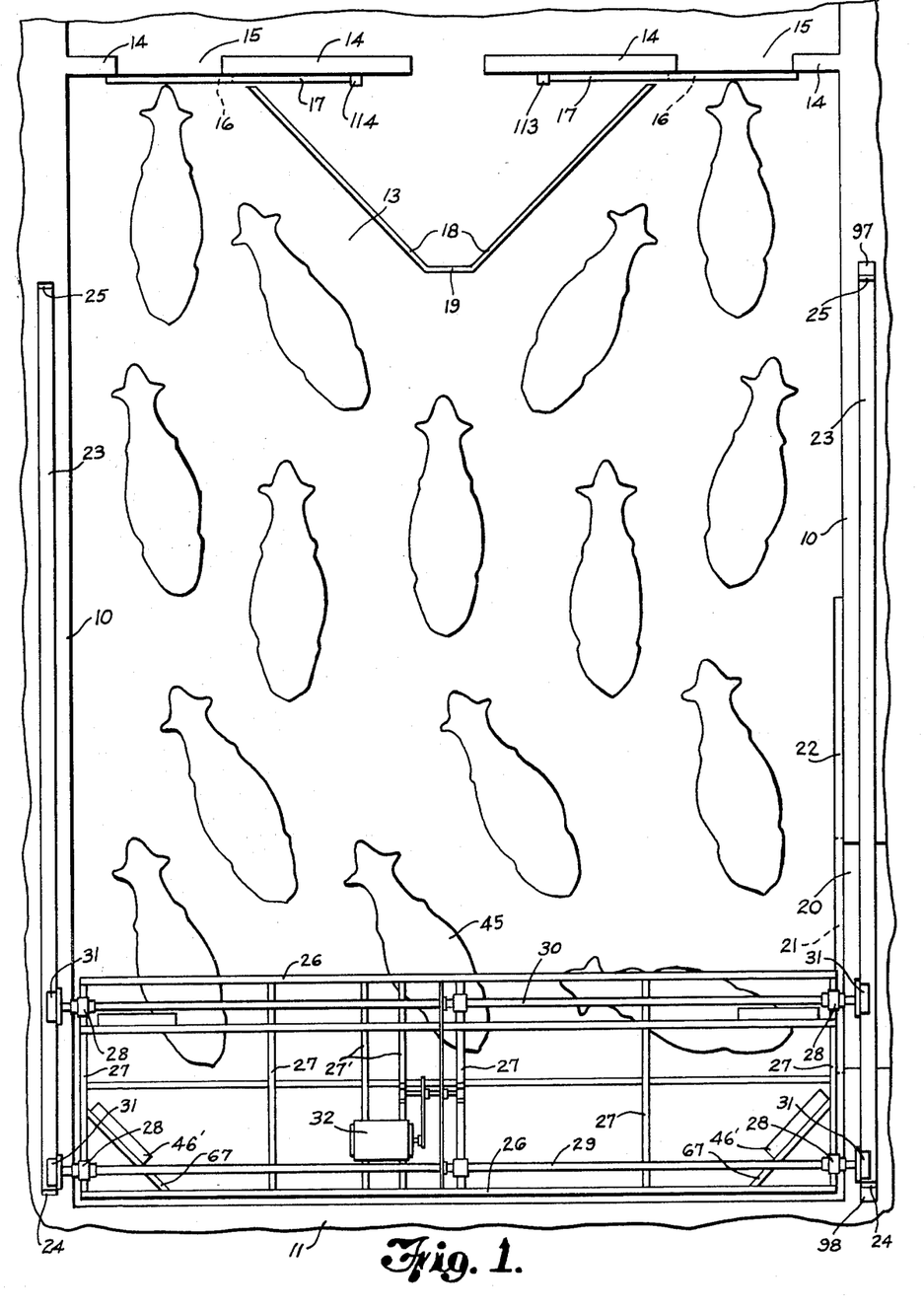
FIG. 1 is a top plan view of a cow runway partly broken away showing our invention applied thereto and showing a fragmentary portion of a milking area.
Figure 2:
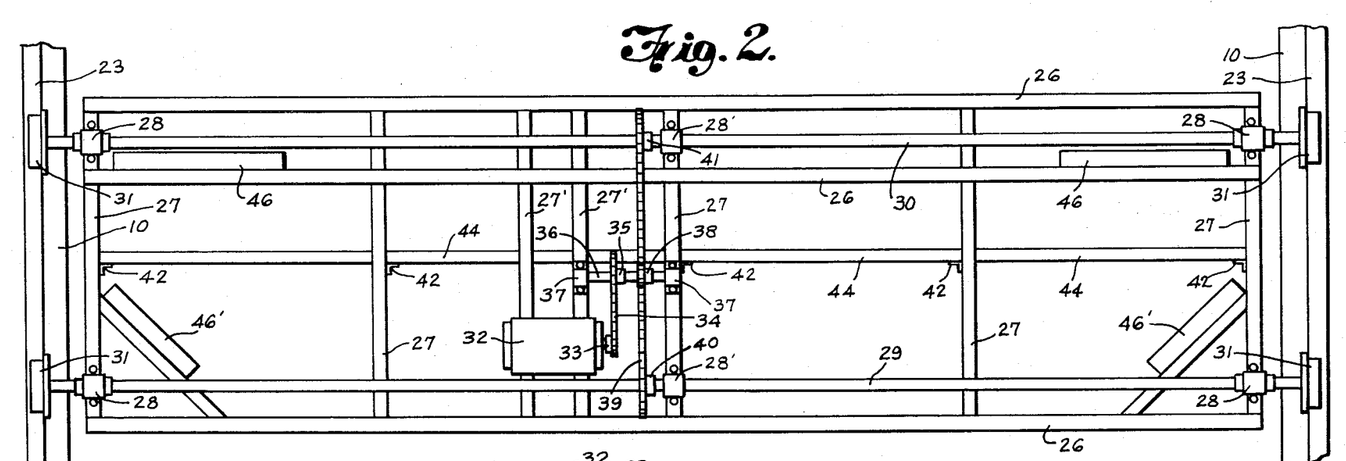
FIG. 2 is a top plan view of our gate mechanism showing fragmentary portions of the side walls of the runway.
Figure 3:
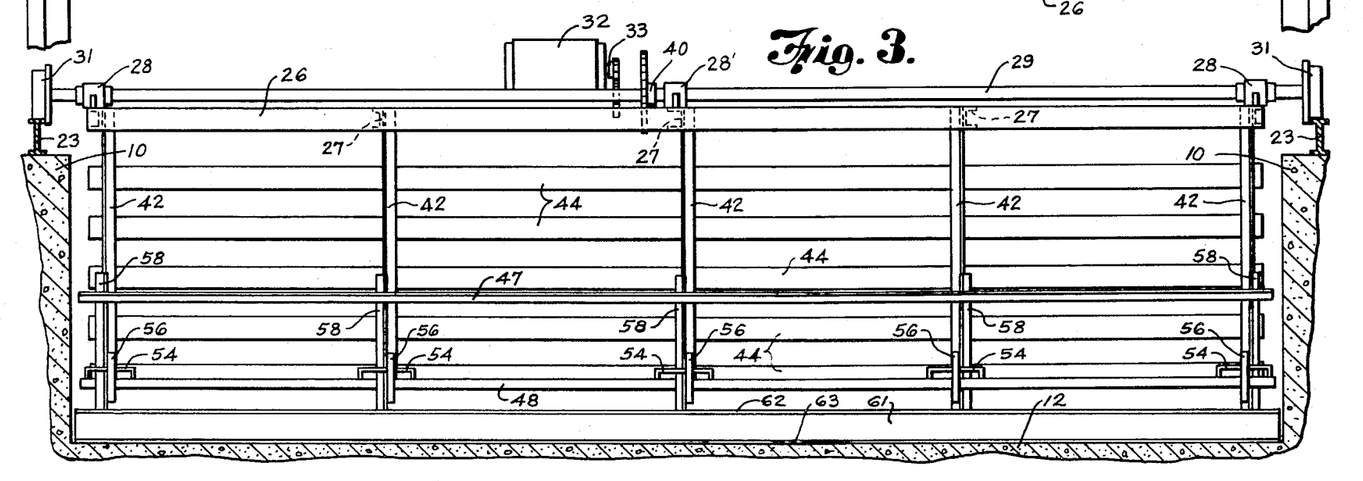
FIG. 3 is a rear elevational view of our gate, fragmentary portions of the runway being shown in section.

In operation, assuming that the gate is in the position shown in FIG. 1, the doors 16 have been opened and the door 21 closed, the cows having entered the runway through the opening 20, the motor 32 is started in a direction to rotate the flanged wheels 31 in a clockwise direction, as viewed in FIG. 4. The cross members 44 of the gate will then move into engagement with one or more of the cows nearest thereto and urge the cow or cows toward the exit end of the runway. When the gate engages the cow, or if the cow should move back against the gate, there will be a tendency for the gate to swing about the shaft 30 as an axis. This tendency will be resisted by the weight of the counterweights 46', which weight will be exerted on the flanged wheels 31 on the shaft 29. Such a pivotal movement would tend to raise the flanged wheels 31 that are on the shaft 29 up off the rails 23, or at least reduce the frictional grip thereof on the track. The reduction in grip of the wheels 31 mounted on shaft 29 would be dependent somewhat on the weight of the counterweighting means 46'.

At the same time the wheels 31 on the shaft 30 will continue to frictionally grip the rails 23 and continue to move the gate toward the exit end of the runway. The continued exertion of force on the rearmost cow or cows will eventually cause them to move forward and the full gripping action of the wheels 31 on the shaft 29 will again be exerted on the rails 23 to continue to move the gate toward the exit end of the runway. By providing the counterweights this action can be controlled so that, while it will be positive, it will be gentle.

Figures 6, 7, 8:
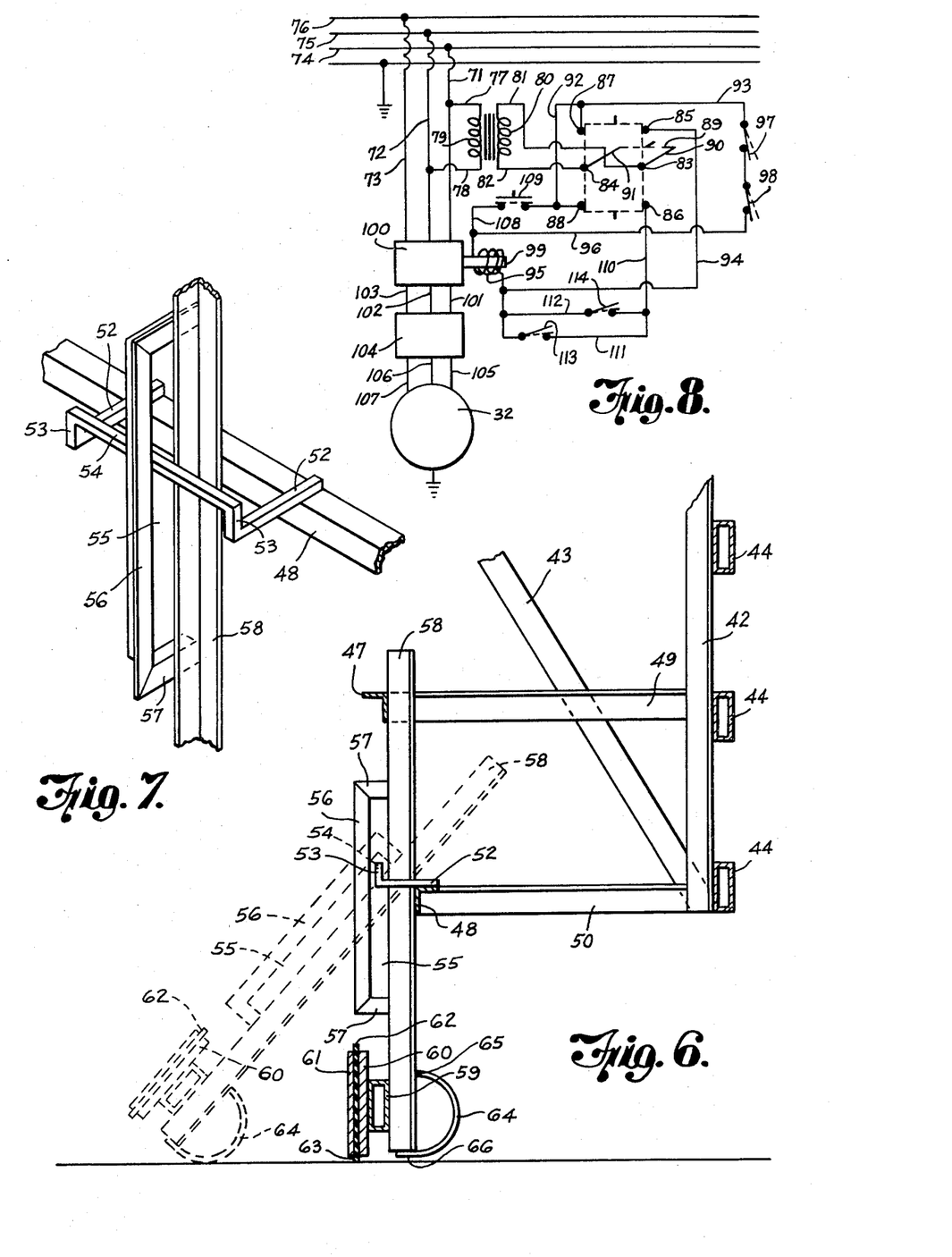
FIG. 6 is a fragmentary view of our gate partly in section and partly in elevation showing the floor scraper in full lines in the scraping position and in dotted lines in its inoperative position.
FIG. 7 is a fragmentary detail view in perspective of a portion of the scraper mounting means.
FIG. 8 is a diagram of the motor controlling circuit.

When the gate is moving toward the exit end of the runway, or in a direction from left to right in FIGS. 4 and 6, and any debris on the floor 13 is encountered by the plate 64, the floor scraping mechanism will move to the dotted line position shown in FIG. 6, due to the mounting thereof on the scraper frame, and the action of the curved plate 64, which will tend to move the scraper mechanism from the full line position to the dotted line position shown in FIG. 6. However, when the motor 32 is reversed and the wheels 31 rotate in a counter-clockwise direction, and the gate travels from right to left, as viewed in FIGS. 4 and 6, the scraper will move to the full line position and remain there because it will be held from moving to an oppositely inclined position because of the engagement of the upstanding angle bars 58 thereon with the angle member 47 on the scraper frame, which serves as a stop member for said bars 58. Accordingly, the scraper will ride over any manure or other debris that may be on the floor of the runway when the gate is moving toward the exit end of the runway, and will be in engagement with the floor to move such manure or other debris when the gate is moving backward toward the end wall 11, causing such manure or other debris to accumulate adjacent the wall 11 when the frame carrying the gate reaches the position shown in FIG. 4 with the set of wheels on the shaft 29 in engagement with the stop member 24.

Referring now to FIG. 8 showing the circuit for controlling the operation of the motor 32, the conductors 71, 72 and 73 extend from the line wires 74, 75 and 76. The conductors 77 and 78 connect the primary winding 79 of a step-down transformer having a secondary winding 80 across the conductors 71 and 72. Conductors 81 and 82 extend from the secondary winding 80 respectively to the terminals 83 and 84 of a switching means having stationary contacts 85, 86, 87, 88 and a movable switching member 89 having movable contact means 90 and 91. The movable contact 90 is adapted to connect the terminal 83 with the stationary contact 85 and the movable contact 91 to connect the terminal 84 with the stationary contact 87 when the switching member 89 is moved to the upper dotted position thereof, shown in FIG. 8, and the movable contact 90 is adapted to connect the stationary contact 86 with the terminal 83 and the movable contact 91 to connect the stationary contact 88 with the terminal 84 in the lower dotted position of the switching member 89 shown in FIG. 8. The conductor that extends from the stationary contact 87 has two branches 92 and 93. A conductor 94 extends from the stationary contact 85 to one end of the solenoid 95 and a conductor 96 extends from the other end of the solenoid 95, the conductors 93 and 95 being connected when the two normally closed limit switches 97 and 98 are in circuit closing position.

The limit switch 97 is so located that it will be opened when the gate reaches a predetermined position adjacent the exit opening 15, and the limit switch 98 so that it will be opened when the gate reaches a predetermined position adjacent the end wall 11. Accordingly, the circuit leading to the solenoid can be closed by moving the switching member 89 to its upper dotted position in FIG. 8 when the gate is in any position between its predetermined end positions. With the switching member 89 in this position and limit switches closed, the circuit from one end of the winding 80 will be through the conductor 81, conductor 94, solenoid 95, conductor 96, limit switches 98 and 97, conductor 93 to conductor 82 and to the other end of winding 80.

Energization of the solenoid 95 will move the operating member 99 of the switch 100 to a circuit closing position connecting the conductors 71, 72 and 73 respectively with the conductors 101, 102 and 103 which extend to the reversing switch 104 from which the conductors 105, 106 and 107 extend to the motor 32. The branch conductor 92 is adapted to be connected with the conductor 108 through a normally open push button switch 109 which is adapted to be held closed manually.

When the switching member 89 is moved to the lower dotted position shown in FIG. 8 the terminal 83 is connected with the contact 86, the terminal 84 with the contact 88, and the switch 109 will connect the conductor 108 with the contact 88 when manually closed. A conductor 110 extends from the contact 86 and branches 111 and 112 extend therefrom, which are connected with one end of the solenoid 95, a normally open limit switch 113 being interposed in the conductor 111 and a normally open limit switch 114 being interposed in the conductor 112. The limit switches 113 and 114 are so located relative to the doors 16 that they will be closed when the doors 16 are in an open position. When one of the doors 16 is opened the circuit can be closed to the solenoid 95 through one of the limit switches 113 and when the other door 16 is opened the circuit would be completed through the closed limit switch 114, and if both doors are opened both limit switches 113 and 114 will be closed. The circuit will then be from the winding 80 through the conductor 81, terminal 83, contact 86, conductor 110 and either the conductor 111 or 112, or both in parallel, depending upon whether one or both of the switches 113 and 114 are closed, to one end of the solenoid 95 and from the other end of the solenoid 95 through the conductor 96, provided the limit switches 97 and 98 are both closed, to the conductor 93 and conductor 82 to the other end of the winding 80.

However, when the gate is in its starting position adjacent end wall 11, the limit switch 98 will be open because of the position of the gate adjacent the wall 11. In order to start the motor it will then be necessary to momentarily close the switch 109 which will establish a circuit from the contact 88 through the conductor 108 to one end of the winding 99 and through the conductors 111 or 112, or both, and the conductor 110 to the contact 86, to the terminal 83 and conductor 81 to the one end of the winding 80, the other end of which is connected with the terminal 84 through the conductor 82 which is connected by the switching member 89 with the stationary contact 88 in the lower dotted position thereof. The switch 100 will thus be moved to circuit closing position long enough to move the gate away from the position in which it is holding open the limit switch 98. Upon closing of the limit switch 98 the circuit will continue to be closed to the winding 95 until the other limit switch 97 is actuated by the movement of the gate into position adjacent the exit end of the runway.

When this occurs, and it is desired to return the gate to its starting position adjacent the end wall 11, the reversing switch is operated to reverse the connections to the motor 32 and the push button switch 109 is operated to momentarily close the circuit between the secondary winding 80 and solenoid 99 to move the gate far enough away from the exit end of the runway to permit the limit switch 97 to close to maintain the circuit that energizes the solenoid 95. Accordingly, when the switching member 89 is in the upper dotted line position thereof shown in FIG. 8, the operating circuit can be energized to close the switch 100 by manually moving the switch to said dotted line position irrespective of whether the doors 16 are open or closed, but when the switching member 89 is in the lower dotted line position thereof, one or both of the doors 16 would have to be opened to close one or both of the switches 113 and 114 before the motor 32 could be started by operation of the push button switch 109.

What we claim is:

1. The combination with upstanding walls and a floor defining a runway for animals, said upstanding walls including a pair of longitudinally extending side walls, an end wall extending between said side walls at one end thereof and end wall portions at the other end of said side walls defining exit openings leading from said runway, one of said side walls having an entrance opening therein adjacent said first mentioned end wall, a rail on each of said side walls, a frame extending transversely of said runway between said rails, bearings on said frame, a pair of parallel shafts mounted in said bearings spaced longitudinally of and extending transversely of said runway, a pair of wheels mounted on each of said shafts to rotate therewith, one wheel of each pair engaging one of said rails and the other wheel of each pair engaging the other of said rails, a motor on said frame, driving means connecting said motor with said shafts to rotate said shafts simultaneously in the same direction, a gate on said frame extending downwardly therefrom to extend transversely of said runway, and counterweights mounted on said frame adjacent said wheels.

2. The combination claimed in claim 1 in which said gate has a floor scraper mounted thereon for both up and down and swinging movement relative thereto.

3. The combination claimed in claim 1 in which said gate has a floor scraper mounted thereon, for both up and down and swinging movement relative thereto, stop means on said gate and means on said scraper engaging said stop means to hold said scraper from swinging movement relative to said gate during movement of said gate toward said first mentioned end wall of said runway.

4. The combination claimed in claim 1 in which said gate has a floor scraper mounted thereon for both up and down and swinging movement relative thereto and said floor scraper has means movable therewith having a convex face riding over debris on said floor during movement of said gate away from said first mentioned end wall of said runway to move said means having said convex face and said scraper away from said floor.

5. The combination claimed in claim 1 in which said gate has a floor scraper mounted thereon for both up and down and swinging movement relative thereto, stop means on said gate, means on said scraper engaging said stop means to hold said scraper from swinging movement relative to said gate during movement of said gate toward said first mentioned end wall of said runway and means movable with said scraper having a convex face riding over debris on said floor during movement of said gate away from said first mentioned wall of said runway to move said means and said scraper away from said floor.

6. The combination claimed in claim 1 in which said gate has a floor scraper mounted thereon for both up and down and swinging movement relative thereto, means for raising said scraper away from said floor upon engagement of said means with debris on said floor during movement of said gate away from said first mentioned end wall of said runway, said means for raising said scraper comprising a curved metal plate on said scraper adjacent said floor and extending transversely across said runway.

7. The combination claimed in claim 1 in which said gate has a floor scraper mounted thereon for both up and down and swinging movement relative thereto, means on said gate engaging said scraper to hold said scraper from swinging movement relative to said gate during movement of said gate toward said first mentioned end wall of said runway and means on said scraper for raising said scraper away from said floor upon engagement of said means with debris on said floor during movement of said gate away from said first mentioned end wall of said runway, said means for raising said scraper comprising a curved metal plate on said scraper adjacent said floor and extending transversely across said runway.

8. The combination claimed in claim 1 in which said gate has a floor scraper mounted thereon for both up and down and swinging movement relative thereto, stop means on said gate, means on said floor scraper engaging said stop means to hold said scraper in floor scraping position during movement of said gate toward said first mentioned end wall and a plate having a convex face riding over debris on said floor to swing said floor scraper out of floor scraping position upon engagement of said plate with said debris during movement of said gate away from said first mentioned wall.

9. The combination claimed in claim 1 in which said gate has a floor scraper mounted thereon for both up and down and swinging movement relative thereto, means for holding said floor scraper in floor scraping position during movement of said gate toward said first mentioned end wall and means for swinging said floor scraper out of floor scraping position upon engagement of said means with debris on said floor during movement of said gate away from said first mentioned end wall comprising a curved metal plate adjacent said floor mounted on said gate for movement with said scraper and extending transversely across said runway.

10. The combination with upstanding walls and a floor defining a runway for animals, said upstanding walls including a pair of longitudinally extending side walls, an end wall extending between said side walls at one end thereof and end wall portions at the other end of said side walls defining exit openings leading from said runway, one of said side walls having an entrance opening therein adjacent said first mentioned end wall, a rail on each of said side walls, a frame extending transversely of said runway between said rails, bearings on said frame, a pair of parallel shafts mounted in said bearings spaced longitudinally of and extending transversely of said runway, a pair of wheels mounted on each of said shafts to rotate therewith one wheel of each pair engaging one of said rails and the other wheel of each pair engaging the other of said rails, a motor on said frame, driving means connecting said motor with said shafts to rotate said shafts simultaneously in the same direction, a gate on said frame extending downwardly therefrom to extend transversely of said runway, and a floor scraper mounted on said gate for up and down and swinging movement relative thereto.

11. The combination claimed in claim 10 in which said gate has stop means thereon and means on said scraper engaging said stop means to hold said scraper from swinging movement in one direction relative to said gate during movement of said gate toward said first mentioned end wall of said runway.

12. The combination claimed in claim 10 in which said scraper has a plate thereon having a convex face riding over debris on said floor to raise said scraper away from said floor upon engagement of said plate with said debris during movement of said gate away from said first mentioned end wall of said runway.

13. The combination claimed in claim 10 in which said gate has means thereon for raising said scraper away from said floor upon engagement of said means with debris on said floor during movement of said gate away from said first mentioned end wall of said runway, comprising a curved plate on said scraper adjacent said floor and extending transversely across said runway.

14. The combination claimed in claim 10 in which said floor scraper comprises a body portion extending substantially from one of said side walls to the other side wall, a scraper member mounted on said body portion, upstanding bars mounted on said scraper body portion in fixed position in spaced relation longitudinally of said scraper body portion, means mounting said bars on said gate for guided up and down and swinging movement relative thereto, comprising a frame mounted on the lower portion of said gate having an upper and a lower longitudinally extending frame member, inter-engaging brackets on said lower frame member and said bars connecting each of said bars with said lower frame member for up and down and swinging movement of said bars relative to said lower frame member, said upper frame member being in the path of swinging movement of said bars in one direction to stop said swinging movement in said direction with said scraper member in floor scraping position, and an arcuate plate mounted on said floor scraper to move with said scraper member in position to ride over debris on said floor during movement of said floor scraper over said floor.

15. The combination claimed in claim 14 in which said brackets on said lower frame member provide guide slots for said bars extending longitudinally of said lower frame member and said brackets on said bars provide guide slots for the brackets on said lower frame member extending longitudinally of said bars.

16. The combination with upstanding walls and a floor defining a runway for animals, said upstanding walls including a pair of longitudinally extending side walls, an end wall extending between said side walls at one end thereof and end wall portions at the other end of said side walls defining exit openings leading from said runway, one of said side walls having an entrance opening therein adjacent said first mentioned end wall, a rail on each of said side walls, a frame extending transversely of said runway between said rails, bearings on said frame, a pair of parallel shafts mounted in said bearings spaced longitudinally of and extending transversely of said runway, a pair of wheels mounted on each of said shafts to rotate therewith and engaging said rails, a motor on said frame, driving means connecting said motor with said shafts to rotate said shafts simultaneously in the same direction, a gate on said frame extending downwardly therefrom to extend transversely of said runway, and a floor scraper mounted on said gate, said floor scraper comprising a body portion extending substantially from one of said side walls to the other side wall, a scraper member mounted on said body portion, upstanding bars mounted on said scraper body portion in fixed position in spaced relation longitudinally of said scraper body portion, means mounting said bars on said gate for guided up and down and swinging movement relative thereto, comprising a frame mounted on the lower portion of said gate having an upper and a lower longitudinally extending frame member, inter-engaging brackets on said lower frame member and said bars connecting each of said bars with said lower frame member for up and down and swinging movement of said bars relative to said lower frame member, said upper frame member being in the path of swinging movement of said bars in one direction to stop said swinging movement in said direction with said scraper member in floor scraping position, and an arcuate plate mounted on said floor scraper to move with said scraper member in position to ride over debris on said floor during movement of said floor scraper over said floor in the opposite direction.

17. The combination claimed in claim 16 in which said brackets on said lower frame member provide guide slots for said bars extending longitudinally of said lower frame member and said brackets on said bars provide guide slots for the brackets on said lower frame member extending longitudinally of said bars.

18. The combination with upstanding walls and a floor defining a runway for animals, said upstanding walls including a pair of longitudinally extending side walls, an end wall extending between said side walls at one end thereof and end wall portions at the other end of said side walls defining exit openings leading from said runway, one of said side walls having an entrance opening therein adjacent said first mentioned end wall, of a gate extending transversely of said runway, means for moving said gate lengthwise of said runway, and a floor scraper mounted on said gate, said floor scraper comprising a body portion extending substantially from one of said side walls to the other side wall, a scraper member mounted on said body portion, upstanding bars mounted on said scraper body portion in fixed position in spaced relation longitudinally of said scraper body portion, means mounting said bars on said gate for guided up and down and swinging movement relative thereto, comprising a frame mounted on the lower portion of said gate having an upper and a lower longitudinally extending frame member, interengaging brackets on said lower frame member and said bars connecting each of said bars with said lower frame member for up and down and swinging movement of said bars relative to said lower frame member, said upper frame member being in the path of swinging movement of said bars in one direction to stop said swinging movement in said direction with said scraper member in floor scraping position, and an arcuate plate mounted on said floor scraper to move with said scraper member in position to ride over debris on said floor during movement of said floor scraper over said floor in the opposite direction.

19. The combination claimed in claim 18 in which said brackets on said lower frame member provide guide slots for said bars extending longitudinally of said lower frame member and said brackets on said bars provide guide slots for the brackets on said lower frame member extending longitudinally of said bars.

* * * * *

UNITED STATES PATENT OFFICE
CERTIFICATE OF CORRECTION

Patent No. 3,799,115                     Dated  March 26, 1974

Inventor(s)  Marvin R. Fullerton et al.

It is certified that error appears in the above-identified patent and that said Letters Patent are hereby corrected as shown below:

On the cover sheet [76] Diamond, Md. 64840" should read

-- Diamond, Mo. 64840 --.

Signed and sealed this 12th day of November 1974.

(SEAL)
Attest:

McCOY M. GIBSON JR.                   C. MARSHALL DANN
Attesting Officer                     Commissioner of Patents